United States Patent [19]

Schmit et al.

[11] 4,240,486
[45] Dec. 23, 1980

[54] STRETCHABLE RADIAL SPARE TIRE

[75] Inventors: Georges J. E. Schmit, Bridel; Thomas N. H. Welter, Keispelt, both of Luxembourg

[73] Assignee: The Goodyear Tire & Rubber Company, Akron, Ohio

[21] Appl. No.: 916,272

[22] Filed: Jun. 16, 1978

[51] Int. Cl.³ .................... B60C 9/00; D02G 3/02
[52] U.S. Cl. .................... 152/330 R; 152/357 R; 152/359; 152/361 R; 156/123 R; 57/210; 57/902
[58] Field of Search ............... 152/354 R, 355, 356 R, 152/356 A, 357 R, 358, 359, 361 R, 361 DM, 330 R, 352 R, 352 A, 353 R, 353 C, 353 G; 156/123 R; 57/222, 216, 220, 225, 226, 902, 210

[56] References Cited

U.S. PATENT DOCUMENTS

| | | | |
|---|---|---|---|
| 2,884,044 | 4/1959 | Hulswit et al. | 152/128 R |
| 3,404,720 | 10/1968 | Fletcher | 152/354 |
| 3,455,100 | 7/1969 | Sidles et al. | 152/356 |
| 3,486,546 | 12/1969 | Sidles et al. | 152/357 |
| 3,495,646 | 2/1970 | Harzocchi | 152/359 |
| 3,540,510 | 11/1970 | Smithkey | 152/352 |
| 3,540,512 | 11/1970 | Heimovics et al. | 152/359 |
| 3,548,910 | 12/1970 | Sperberg | 152/359 |
| 3,560,286 | 2/1971 | Sidles et al. | 156/132 |
| 3,622,414 | 11/1971 | Heimovics et al. | 156/128 R |
| 3,730,246 | 5/1973 | Sidles et al. | 152/356 |
| 3,756,883 | 9/1973 | Gay | 156/133 |
| 3,904,463 | 9/1975 | Boileau | 152/354 |
| 3,929,180 | 12/1975 | Kawase et al. | 152/356 |

*Primary Examiner*—William A. Powell
*Assistant Examiner*—Lois E. Rodgers
*Attorney, Agent, or Firm*—Frederick K. Lacher; Frank Pincelli

[57] ABSTRACT

A radial spare tire which, upon inflation, stretches from a shape having a reduced diameter adjacent the wheel rim on which the tire is mounted, to a regularly sized radial tire which the spare tire is designed to replace. The tire is molded and vulcanized in an unstretched configuration of reduced size. The stretching of the tire is made possible by the utilization in the carcass and belt plies of reinforcement cords which, during the processing of the cord and building of the tire, have a relatively high modulus of elasticity. When the cords are subjected to vulcanization temperatures, they lose their strength and have a low modulus of elasticity to permit the stretching of the tire to a regular size. The cords then develop a high modulus of elasticity in the stretched condition to provide the required reinforcement of the tire in the inflated regular size condition.

9 Claims, 5 Drawing Figures

STRETCHABLE RADIAL SPARE TIRE

BACKGROUND OF THE INVENTION

Full size radial tires have been built with highly elongatable cords in the belt plies for allowing the original unvulcanized tire to be built in a cylindrical shape, rather than the more conventional toroidal shape in which radial tires are normally built. Foldable spare tires of the bias-belted type have also been made; however, the same methods and constructions cannot be used to build a reduced diameter tire of the radial type because of the horrendous problems created by the radical difference between the cord angles of the reinforcement cords of the radial carcass plies and the cord angles of the cords in the belt structure. The invention is directed to the method of making and the construction of a stretchable radial tire which, when deflated, is as small as the foldable spare tires of the prior art.

Briefly stated, the invention is in a stretchable radial tire which is molded and vulcanized in a small, unstretched configuration and which is highly expansible upon inflation of the tire. This is made possible by the use, in the carcass plies and belt structure, of reinforcement cords which initially have a relatively high modulus of elasticity and then after vulcanization a relatively low modulus of elasticity up to a predetermined elongation when the cords develop a relatively high modulus of elasticity.

DESCRIPTION OF THE DRAWING

The following description of the invention will be better understood by having reference to the annexed drawing, wherein.

DETAILED DESCRIPTION OF THE DRAWING

Figure 1:
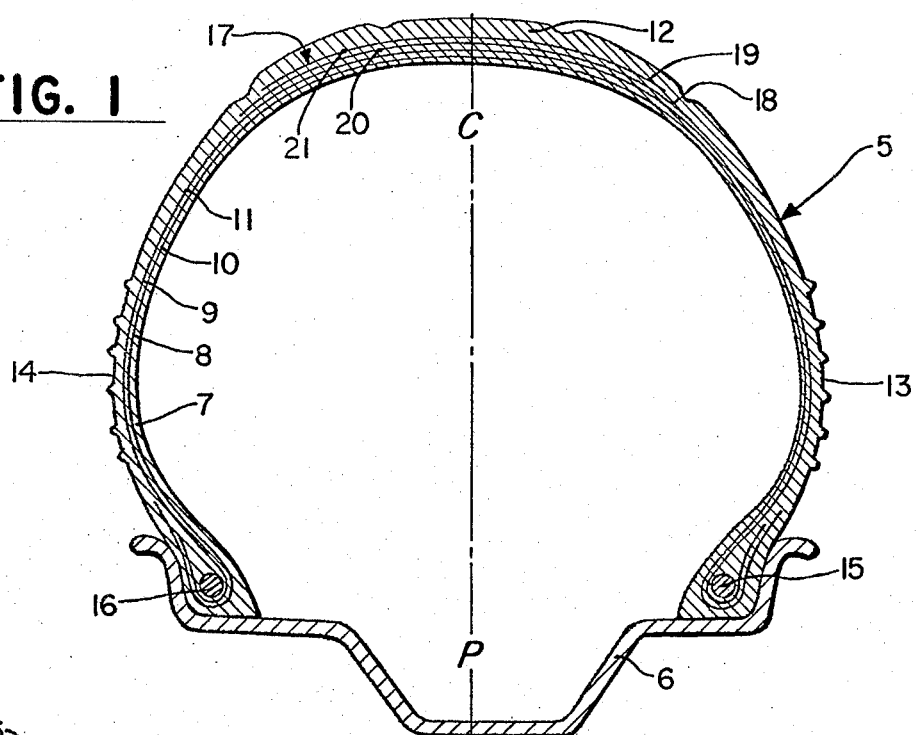
FIG. 1 is a section of an expandable, spare radial tire mounted on a wheel rim, the tire being in the inflated condition and made in accordance with the invention.
Figure 2:
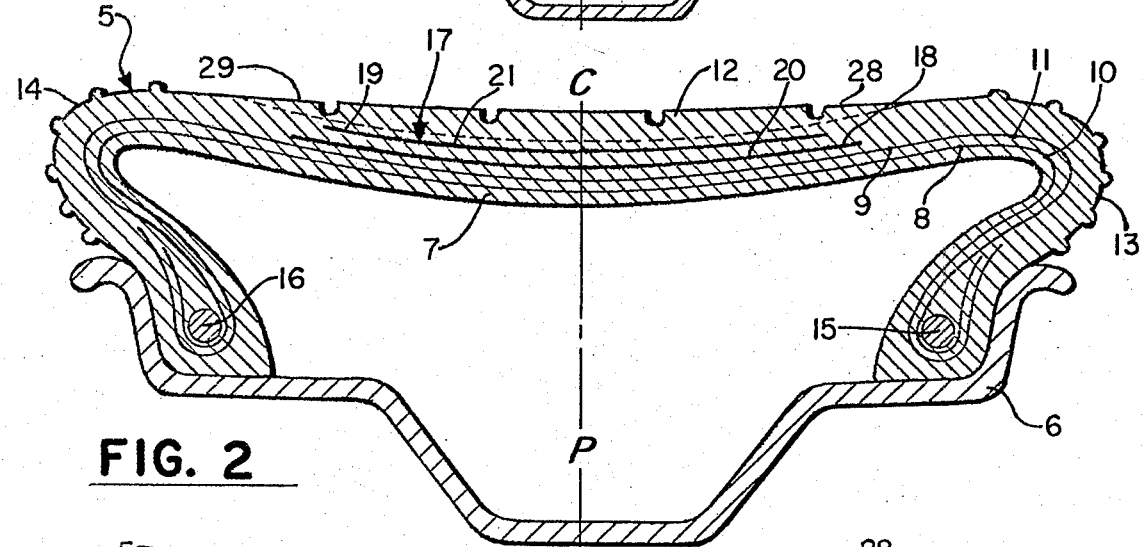
FIG. 2 is a section of the tire and wheel rim, illustrating the unstretched tire in the molded shape of reduced diameter mounted on the wheel rim.

With reference to the drawing, and especially FIG. 1, there is shown an expandable, spare radial tire 5 mounted on a wheel rim 6 in the inflated extended condition. As shown in FIGS. 1 and 2, the spare radial tire 5 essentially comprises a fluid impervious innerliner 7 disposed at the radially inner surface of the tire 5 within a plurality of carcass plies 8,9 which are reinforced with parallel cords 10,11; a tread 12 and pair of sidewalls 13,14 surrounding the carcass plies 8,9 and terminating at a pair of annular inextensible cable beads 15,16 comprising cabled wires. A belt structure 17, consisting of a pair of superimposed belt plies 18,19 is interposed between the tread 12 and radially outermost carcass ply 9.

Figure 5:
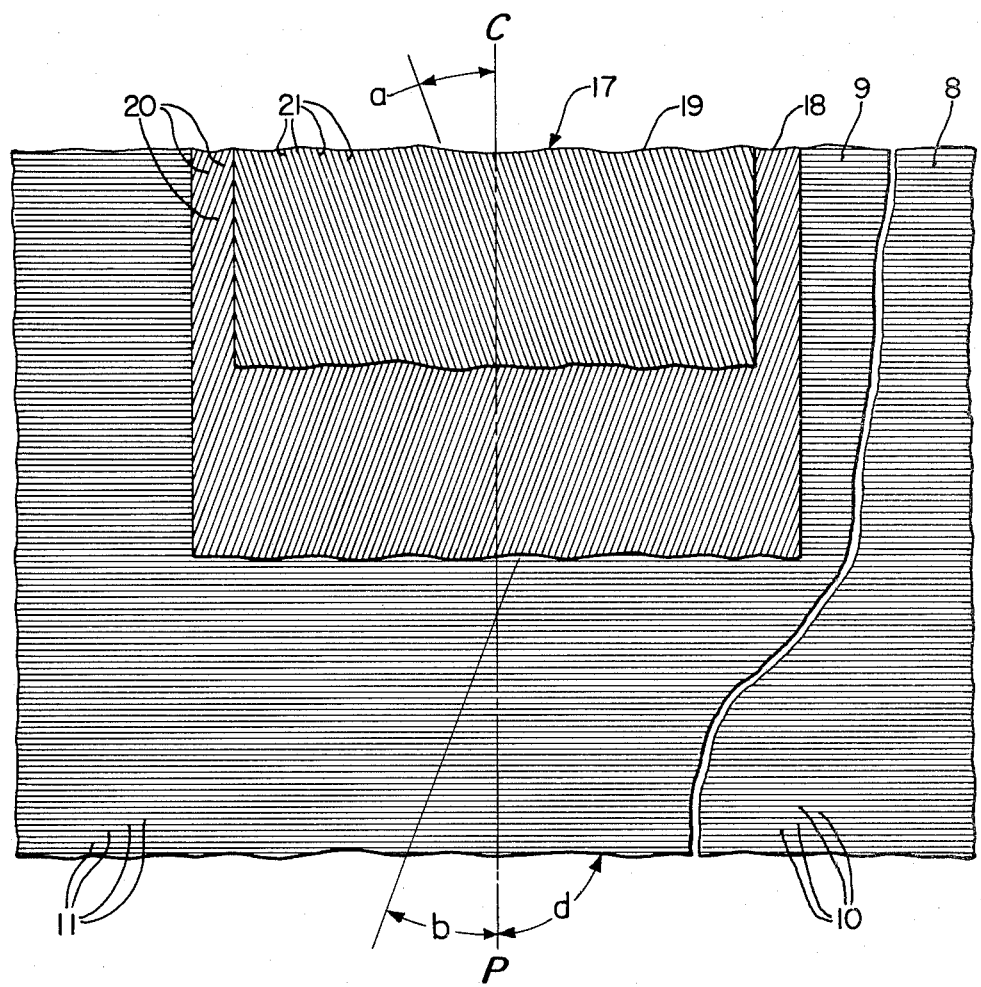
FIG. 5 is an enlarged fragmentary plan view of the belt plies and carcass plies of the vulcanized tire with parts being broken away to show the direction of the cords in the plies.

As shown in FIG. 5, the belt plies 18,19 are reinforced with parallel cords 20,21 which cross and extend in opposite directions from a plane CP containing the mid-circumferential centerline of the tread 12, such plane hereinafter referred to as the centerplane. The reinforcement cords 20,21 of the belt structure 17 are disposed at angles a and b in the broad range of 0°–30° and preferably the narrower range of 10°–25°, measured relative to the centerplane CP when the tire is vulcanized and deflated. The reinforcement cords 10,11 of the carcass plies 8,9 are radially oriented between the tire beads 15,16, i.e. they are disposed at angles d in the range of 75°–90° measured relative to the centerplane. The rubber material of the carcass plies 8,9 and belt plies 18,19 is preferably a soft, low modulus compound having a modulus of elasticity smaller than 15 MPa (Mega Pascal) or 150 kg/cm² and preferably smaller than 10 MPa or 100 kg/cm² at 100 percent elongation.

Figure 4:
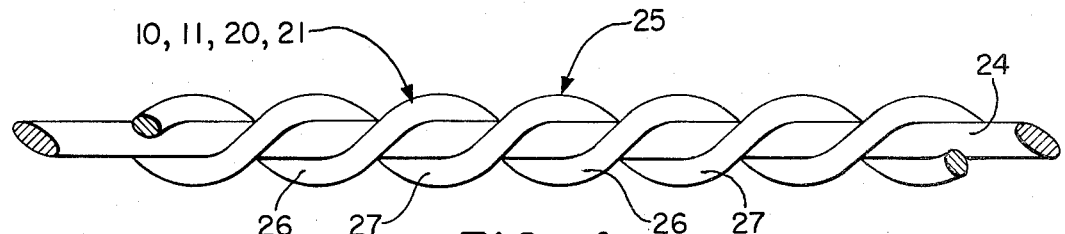
FIG. 4 is a perspective view of a composite cord used in the reinforcement of the tire.

The reinforcement cords 10,11 of the carcass plies 8,9 and 20,21 of the belt structure 17 are, as best seen in FIG. 4, each characterized by having a relatively high modulus of elasticity during the processing of the cord and the building of the tire. After the cords are subjected to vulcanization temperatures, they develop a low modulus of elasticity and are highly elongatable up to a predetermined length when they again develop a high modulus of elasticity and have a high resistance to elongation. These reinforcement cords 10,11 and 20,21 are each a composite of a central core 24 and outer spiral wrapping 25 which includes a plurality of inextensible yarns 26,27 coiled around core 24. The inextensible yarns 26,27 are each composed of a single twisted strand or of a plurality of strands cabled together each of the strands being composed of filaments of a suitable material such as, for example, a material of the group of rayon, nylon, polyester, aramid, or steel. The primary purpose of the core 24 is to provide the cord strength to maintain the inextensible yarn 26,27 in helical relation during any processing of the cord such as dipping, calendering, or building of the tire 5. The core 24 is preferably made of a polymer of the group consisting of polyolefines including polyethylene and polypropylene such as that described in copending U.S. patent application Ser. No. 916,271, which was concurrently filed with this application. A core 24 such as a polymeric monofilament of polyethylene with a gauge of 0.5 millimeters and inextensible yarns 26,27 of 1500 denier aramid strands, twisted 6 turns per centimeter around the core, was found especially suitable for building a spare radial tire 5 with a reduced diameter. The reinforcement cords 10,11 and 20,21 are stretchable or elongatable broadly from 50–100 percent and preferably from 65–85 percent after being subjected to temperatures normally used for vulcanization.

Figure 3:
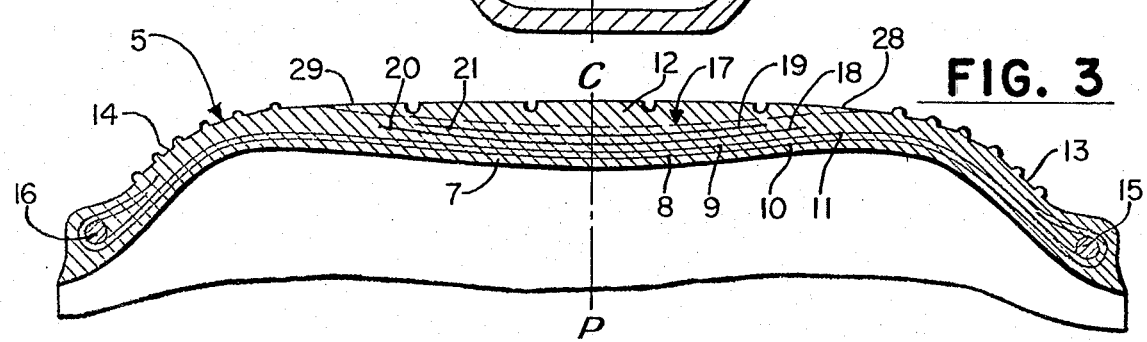
FIG. 3 is a section of a modified tire shown in an alternative molded and vulcanized shape, prior to mounting on the wheel rim.

According to an aspect of the invention, the expandable spare radial tire 5 may be built by placing the aforementioned components 7–21 on a conventional cylindrical tire building drum, to build an unvulcanized tire 5 which is axially smaller than normal. The unvulcanized tire 5 is then shaped, molded and vulcanized in the radially smaller than normal operating configuration illustrated in FIG. 3, where the tread 12 and upper sidewalls 28,29 are generally cylindrical and the remaining, major portions of the sidewalls 13,14 diverge from the tread 12 in directions away from the centerplane CP of the tire 5. Alternatively, the unvulcanized tire 5 can be molded and vulcanized in the deflated configuration with the sidewalls 28,29 generally U-shaped as illustrated in FIG. 2.

The vulcanized spare tire 5 is then mounted on the wheel rim 6, as best seen in FIG. 2, where the outer diameter of the tire is adjacent the wheel rim 6. After vulcanization, the core 24 of each of the cords 10, 11, 20 and 21 has a reduction in tensile strength of from 10 kilograms to zero or a negligible amount and consequently the modulus of elasticity of the cords is greatly reduced. This permits stretching out of the yarns 26,27 so that upon inflation with air, the spare tire 5 stretches toroidally to a regularly sized tire which the spare tire 5 is designed to replace. The cords 10, 11, 20 and 21 develop a high modulus of elasticity when the yarns 26,27 are stretched out a predetermined amount at which point the tire 5 is expanded to the size of a regular tire. The cords 10, 11, 20 and 21 therefore provide the necessary reinforcement for the inflated expanded tire.

Thus, there has been described an expandable spare radial tire which, upon inflation with air, is stretchable from a deflated storage position on the wheel rim to an expanded condition where the spare tire resembles, in size, the tire it is replacing on the automobile.

What is claimed is:

1. A stretchable tire, comprising:
   (a) at least one carcass ply reinforced with radially oriented cords disposed at angles in the range of from 75-90 degrees relative to a centerplane containing the mid-circumferential centerline of the tread of the tire when the tire is molded, vulcanized and uninflated in a storage shape, said cords of said carcass ply being highly elongatable in an amount of from 50 to 100 percent to allow for toroidal expansion of the tire to an inflated operating shape;
   (b) a fluid impervious innerliner disposed at the radially inner surface of said tire within said carcass ply;
   (c) a tread and pair of sidewalls surrounding said carcass ply and terminating at a pair of annular beads;
   (d) at least one belt ply of cords interposed between said carcass ply and tread for annularly reinforcing the tire, said cords of said belt ply being disposed at angles in the range of from 0-30 degrees measured from said centerplane when the tire is molded, vulcanized and uninflated in said storage shape, and also being highly elongatable in an amount of from 50 to 100 percent to allow for circumferential expansion of the tread upon inflation of the tire to said inflated operating shape;
   (e) each of said reinforcement cords of said carcass ply and said belt ply consisting of a central core and at least one inextensible yarn spirally wrapped around said core, the tensile strength of said core being sufficient prior to being subjected to temperatures of vulcanization to maintain said inextensible yarn in helical relation during building of the tire and shaping to said storage shape from an unvulcanized cylindrical shape; and
   (f) said core being of a material having a sufficient reduction in tensile strength when subjected to temperatures of vulcanization of the tire to permit the stretching out of said yarn after the tire is vulcanized and during expansion of the tire from said deflated storage shape with said yarn in the spirally wrapped condition to said inflated operating shape with said yarn in the stretched out condition.

2. The tire of claim 1, wherein said core is composed of a polymer of the group of polyolefines.

3. The tire of claim 2 wherein said polyolefines include polyethylene and polypropylene.

4. The tire of claim 1, wherein said inextensible yarn consists of at least one twisted strand composed of filaments of material of the group of rayon, nylon, polyester, aramid and steel.

5. The tire of claim 1, which includes two carcass plies reinforced with radially oriented cords, and two belt plies of cords between the tread and radially outermost ply of said carcass plies, said cords of said belt plies crossing and being disposed at identical cord angles measured in opposite directions from said centerplane.

6. The tire of claim 1, wherein said cords of said carcass ply and belt ply are each characterized after vulcanization by an initial low modulus of elasticity and high elongation and subsequent high modulus of elasticity and low elongation after said cords elongate a predetermined amount.

7. The tire of claim 1, wherein said cords of said carcass ply and belt ply are embedded in rubber material having a modulus of elasticity less than 150 kg/cm$^2$ at 100 percent elongation.

8. The tire of claim 1, wherein said core has a tensile strength of 10 kilograms prior to vulcanization and said reduction in tensile strength at temperatures of vulcanization is from 10 kilograms to zero or a negligible amount.

9. The tire of claim 1, wherein said core consists of a monofilament.

* * * * *